(12) United States Patent  
Kang et al.

(10) Patent No.: US 10,942,593 B2
(45) Date of Patent: *Mar. 9, 2021

(54) IN-CELL TOUCH DISPLAY DEVICE

(71) Applicant: LG Display Co., Ltd., Seoul (KR)

(72) Inventors: ZeeYoung Kang, Gwangju (KR); YoungDo Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,056

(22) Filed: Feb. 26, 2020

(65) Prior Publication Data

US 2020/0192515 A1 Jun. 18, 2020

Related U.S. Application Data

(63) Continuation of application No. 15/796,434, filed on Oct. 27, 2017, now Pat. No. 10,613,660.

(30) Foreign Application Priority Data

Oct. 31, 2016 (KR) .......................... 10-2016-0142937

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/136209* (2013.01); (Continued)

(58) Field of Classification Search
CPC ...... G06F 3/0412; G06F 3/044; G06F 3/0416; G06F 3/045; G02F 1/1368; (Continued)

(56) References Cited

U.S. PATENT DOCUMENTS 9,024,913 B1* 5/2015 Jung .................... G09G 3/3696
345/174
9,223,425 B1 12/2015 Kim et al.
(Continued)

FOREIGN PATENT DOCUMENTS

CN 104679365 A 6/2015
CN 105022523 A 11/2015
(Continued)

OTHER PUBLICATIONS

Japan Patent Office, Decision of Refusal, JP Patent Application No. JP 2017-205753, dated May 14, 2019, eight pages.
(Continued)

*Primary Examiner* — Amit Chatly
(74) *Attorney, Agent, or Firm* — Fenwick & West LLP

(57) ABSTRACT

Disclosed is an in-cell touch display device for preventing direct current DC accumulation from being caused by a DC voltage electric field despite using a high-resistance black matrix. The in-cell touch display device may include the passivation layer that covers the back transistor. The passivation layer may block a DC voltage electric field or may disperse electric charges accumulated based on the DC voltage electric field, and thus, even in a case where the high-resistance BM is used, DC accumulation is not caused by the DC voltage electric field. Accordingly, the in-cell touch display device prevents the DC accumulation from being caused by the DC voltage electric field despite using the high-resistance BM, thereby reducing adsorption of a pollution component.

8 Claims, 5 Drawing Sheets

(51) Int. Cl.
*G09G 3/36* (2006.01)
*G02F 1/1333* (2006.01)
*G02F 1/1362* (2006.01)
*G06F 3/045* (2006.01)
*G02F 1/133* (2006.01)
*G02F 1/1368* (2006.01)

(52) U.S. Cl.
CPC ........ *G02F 1/136286* (2013.01); *G06F 3/044* (2013.01); *G06F 3/045* (2013.01); *G06F 3/0416* (2013.01); *G09G 3/3655* (2013.01); *G09G 3/3685* (2013.01); *G09G 3/3696* (2013.01); *G02F 1/1368* (2013.01); *G02F 1/13306* (2013.01); *G09G 2330/06* (2013.01)

(58) Field of Classification Search
CPC ........... G02F 1/13306; G02F 1/136209; G02F 1/13338; G02F 1/136286; G09G 2330/06; G09G 3/3655; G09G 3/3696; G09G 3/3685

See application file for complete search history.

(56) References Cited

U.S. PATENT DOCUMENTS

| | | | |
|---|---|---|---|
| 10,394,407 B2 | 8/2019 | Lee et al. | |
| 10,613,660 B2* | 4/2020 | Kang | G06F 3/044 |
| 2005/0185109 A1* | 8/2005 | Rho | G02F 1/136213 349/44 |
| 2007/0091013 A1 | 4/2007 | Pak et al. | |
| 2010/0097548 A1 | 4/2010 | Koito et al. | |
| 2011/0148826 A1 | 6/2011 | Koyama et al. | |
| 2012/0068944 A1 | 3/2012 | Oh et al. | |
| 2013/0196468 A1 | 8/2013 | Yamazaki | |
| 2013/0258221 A1 | 10/2013 | Fujimoto | |
| 2014/0043734 A1* | 2/2014 | Kim | H05K 13/00 361/679.01 |
| 2014/0168540 A1 | 6/2014 | Wang et al. | |
| 2014/0184543 A1 | 7/2014 | Kim et al. | |
| 2014/0374859 A1 | 12/2014 | Kasai | |
| 2015/0153858 A1 | 6/2015 | Kim et al. | |
| 2016/0180781 A1 | 6/2016 | Kim et al. | |
| 2016/0195956 A1 | 7/2016 | Zhao et al. | |
| 2017/0192614 A1 | 7/2017 | Lee et al. | |
| 2018/0102085 A1* | 4/2018 | Pan | G09G 3/3291 |

FOREIGN PATENT DOCUMENTS

| | | |
|---|---|---|
| CN | 105426026 A | 3/2016 |
| CN | 105786274 A | 7/2016 |
| JP | H 05-188362 A | 7/1993 |
| JP | 2007-157374 A | 6/2007 |
| JP | 2008-233476 A | 10/2008 |
| JP | 2010-096993 A | 4/2010 |
| JP | 2011-070092 A | 4/2011 |
| JP | 2013-175718 A | 9/2013 |
| JP | 2013-180345 A | 9/2013 |
| JP | 2013-205504 A | 10/2013 |
| JP | 2016-107498 A | 6/2016 |
| JP | 2016-118767 A | 6/2016 |
| KR | 10-2016-0092114 A | 8/2016 |
| TW | I454789 | 10/2014 |
| TW | I505253 | 10/2015 |
| TW | I517000 | 1/2016 |
| TW | I552053 | 10/2016 |

OTHER PUBLICATIONS

United States Office Action, U.S. Appl. No. 15/796,434, dated Aug. 15, 2019, 11 pages.
United States Office Action, U.S. Appl. No. 15/796,434, dated Feb. 25, 2019, ten pages.
China National Intellectual Property Administration, Office Action, CN Patent Application. 201711032524.9, dated Jun. 1, 2020, 12 pages.

* cited by examiner

IN-CELL TOUCH DISPLAY DEVICE

CROSS-REFERENCE TO RELATED APPLICATIONS

This patent application is a continuation of U.S. patent application Ser. No. 15/796,434 filed on Oct. 27, 2017 which claims the benefit of Republic of Korea Patent Application No. 10-2016-0142937 filed on Oct. 31, 2016, each of which is hereby incorporated by reference in its entirety.

BACKGROUND

Field of Technology

The present disclosure relates to an in-cell touch display device.

Discussion of the Related Art

In an information-oriented society, technology relevant to the field of display devices for displaying visual information as an image or a picture is being developed. Particularly, there are touch display devices each including a display panel which senses a touched position and a touch force when a user contacts a display area displaying an image or applies a force to the display area with a finger, a pen, or the like. The touch display devices are being widely applied to smartphones, automated teller machines (ATMs), ticket vending machines, exhibitions, etc. for immediate and mutual communication between a user and a machine.

Each touch display device includes a display panel which displays an image and senses a touch, a panel driver for driving the display panel, and a timing controller that supplies a signal for controlling the panel driver. The panel driver includes a gate driver, which supplies a gate signal to a plurality of pixels, and a data driver that supplies data voltages to the pixels. The data driver includes a plurality of source drive integrated circuits (ICs).

A display device where a display panel for displaying an image and a touch panel for sensing a touch are individually provided is defined as an on-cell touch display device. On the other hand, a display device where a display panel for displaying an image supplies touch sensing-enabled information to a touch driver is defined as an in-cell touch display device. The in-cell touch display device does not include a separate touch panel, thereby decreasing a thickness of the touch display device.

The in-cell touch display device includes elements for sensing a user touch applied to a display area. Therefore, the in-cell touch display device has a display period where an image is displayed and a touch period where a touch is sensed. During the touch period, the display panel is supplied with a common voltage Vcom for sensing a touch.

A direct current (DC) voltage electric field (DC field) based on the common voltage is generated in an outer area of the display area. A black matrix (BM) which divides the pixels in order for light emitted from the pixels not to be mixed with one another is provided on an upper substrate of the display panel. A general resin BM is a BM formed of a resin having a resistance which is $10^6$ Ω/D or less per unit length. The general resin BM is relatively low in resistance, and thus, disperses electric charges well. Therefore, in a case using the general resin BM, a DC accumulation amount based on the DC voltage electric field is small.

However, the general resin BM prevents a capacitance from being generated between a touch electrode and a finger due to a touch by a finger or the like. A capacitance is generated between the general resin BM and a finger. Therefore, in a case where the general resin BM is applied to the in-cell touch display device, touch performance is reduced. Therefore, among resin BMs, a high-resistance BM formed of a resin having a resistance which is $10^{10}$ Ω/D or more per unit length should be used for enhancing a touch performance of the in-cell touch display device.

When the DC voltage electric field is generated for a long time, the high resistance of the high-resistance BM makes it difficult to disperse electric charges. For this reason, DC accumulation is caused by the DC voltage electric field. In the in-cell touch display device including the high-resistance BM which is high in DC accumulation amount, adsorption of a pollution component occurs frequently.

SUMMARY

Accordingly, the present disclosure is directed to provide an in-cell touch display device that substantially obviates one or more problems due to limitations and disadvantages of the related art.

An aspect of the present disclosure is directed to provide an in-cell touch display device for preventing DC accumulation from being caused by a DC voltage electric field despite using a high-resistance BM.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these advantages and in accordance with the purpose of the disclosure, as embodied and broadly described herein, provided is an in-cell touch display device including a display panel including a pixel displaying an image in a display period and a common electrode sensing a touch in a touch period, a data driver supplying a data voltage for driving of the pixel, a common voltage compensator generating a common voltage for driving of the common electrode, a back transistor supplying the common voltage to the common electrode, and a passivation layer covering the back transistor.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
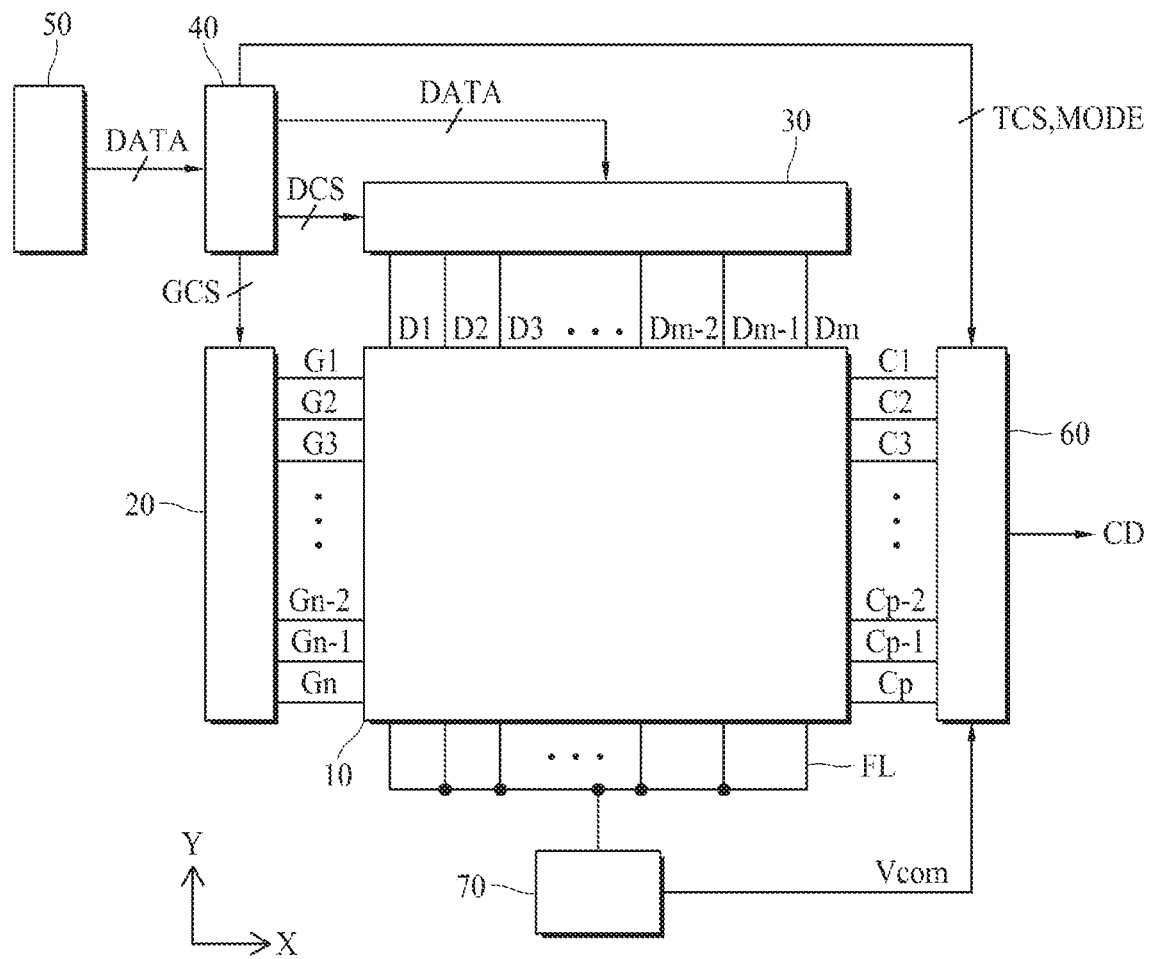
FIG. 1 is a block diagram illustrating an in-cell touch display device according to one embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through the following embodiments described with reference to the accompanying drawings. The present disclosure may, however, be embodied in different forms and should not be limited to the embodiments set forth herein. Rather, these embodiments are provided so that the present disclosure is thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely examples, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of the present disclosure will be described in detail with reference to the accompanying drawings.

Figure 2:
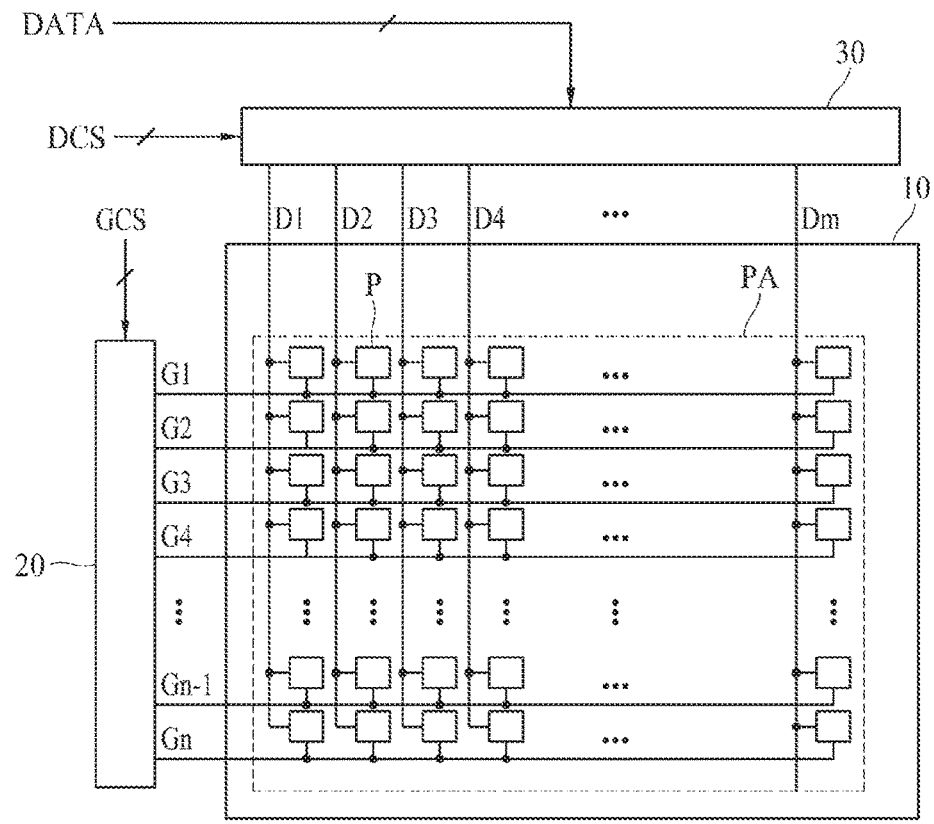
FIG. 2 is a diagram illustrating in detail pixels, data lines, gate lines, a gate driver, and a data driver of a display panel of FIG. 1 according to one embodiment of the present disclosure.
Figure 3:
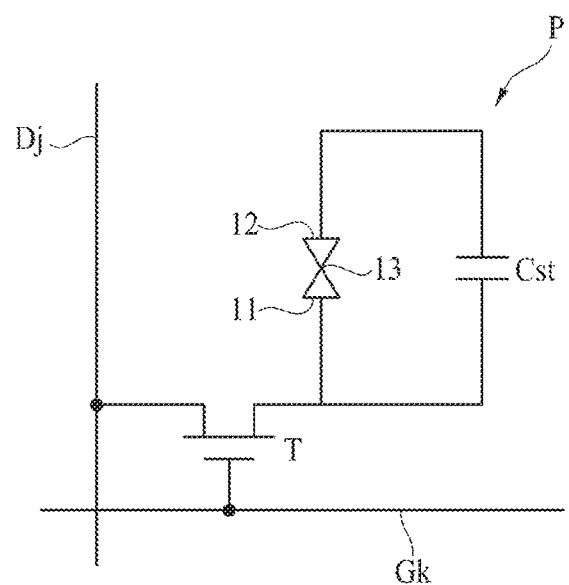
FIG. 3 is a diagram illustrating in detail a pixel of FIG. 2 according to one embodiment of the present disclosure.

FIG. 1 is a block diagram illustrating an in-cell touch display device according to an embodiment of the present disclosure. FIG. 2 is an exemplary diagram illustrating in detail pixels P, data lines D1 to Dm, gate lines G1 to Gn, a gate driver 20, and a data driver 30 of a display panel 10 of FIG. 1. FIG. 3 is an exemplary diagram illustrating in detail each of the pixels P of FIG. 2. Hereinafter, an example where the in-cell touch display device according to an embodiment of the present disclosure is a liquid crystal display (LCD) device will be described.

The in-cell touch display device according to an embodiment of the present disclosure may include a display panel 10, a gate driver 20, a data driver 30, a timing controller (T-con) 40, a main processor 50, a touch driver 60, and a common voltage compensator 70.

The display panel 10 may include an upper substrate, a lower substrate, and a liquid crystal layer 13 disposed between the upper substrate and the lower substrate. A plurality of data lines D1 to Dm (where m is a positive integer equal to or more than two), a plurality of gate lines G1 to Gn (where n is a positive integer greater than or equal to two), a plurality of common lines C1 to Cp (where p is a positive integer greater than or equal to two), and a plurality of feedback lines FL may be provided on the lower substrate of the display panel 10. The data lines D1 to Dm, the common lines C1 to Cp, and the feedback lines FL may intersect the gate lines G1 to Gn.

The pixels P, as illustrated in FIG. 2, may be respectively provided in intersection portions of the data lines D1 to Dm and the gate lines G1 to Gn. Each of the pixels P may be connected to a data line and a gate line corresponding thereto. Each of the pixels P, as illustrated in FIG. 3, may include a transistor T, a pixel electrode 11, and a storage capacitor Cst. The transistor T may be turned on by a gate signal of a kth (where k is a positive integer satisfying $1 \leq k \leq n$) gate line Gk and may supply a data voltage of a jth (where j is a positive integer satisfying $1 \leq j \leq m$) data line Dj to the pixel electrode 11.

A common electrode 12 may be supplied with a common voltage through one of the common lines C1 to Cp. Therefore, each of the pixels P may drive a liquid crystal of the liquid crystal layer 13 based on a potential difference between the data voltage supplied to the pixel electrode 11 and the common voltage supplied to the common electrode 12, thereby controlling a transmittance of light irradiated from a backlight unit. As a result, the pixels P may display an image. The storage capacitor Cst may be provided between the pixel electrode 11 and the common electrode 12 and may maintain a constant voltage difference between the pixel electrode 11 and the common electrode 12.

The feedback lines FL may be grouped into one line and may be connected to the common voltage compensator 70.

A color filter (CF) and a black matrix (BM), which divide the pixels P in order for light emitted from the pixels P to not to be mixed with one another, may be provided on the upper substrate of the display panel 10. However, in a case where the display panel 10 is provided in a color filter on thin film transistor (TFT) (COT) structure, the BM and the CF may be provided on the lower substrate of the display panel 10.

A polarizer may be attached on each of the upper substrate and the lower substrate of the display panel 10, and an alignment layer for adjusting a pre-tilt angle of the liquid crystal may be provided on each of the upper substrate and the lower substrate. A column spacer for maintaining a cell gap of a liquid crystal cell may be provided between the upper substrate and the lower substrate of the display panel 10.

The backlight unit may be disposed under a bottom of the lower substrate of the display panel 10. The backlight unit may be implemented as an edge type or direct type backlight unit and may irradiate light onto the display panel 10.

The gate driver 20 may generate gate signals according to a gate driver control signal GCS supplied from the timing controller 40 during a display period DP. The gate driver 20 may supply the gate signals to the gate lines G1 to Gn in a predetermined order during the display period DP. The predetermined order may be a sequential order.

The data driver 30 may be supplied with digital video data DATA and a data driver control signal DCS from the timing controller 40 during the display period DP. The data driver 30 may convert the digital video data DATA into analog data voltages according to the data driver control signal DCS during the display period DP. The data driver 30 may supply the data voltages to the data lines D1 to Dm during the display period DP.

The timing controller 40 may receive the digital video data DATA and timing signals from a main processor 50. The timing signals may include a vertical synchronization signal (Vsync), a horizontal synchronization signal (Hsync), a data enable signal (DE), a dot clock (DCLK), etc. The vertical synchronization signal may be a signal that defines one frame period. The horizontal synchronization signal may be a signal that defines one horizontal period where data voltages are respectively supplied to pixels of one horizontal line of the display panel 10. The pixels of the one horizontal line may be connected to the same gate line. The data enable signal may be a signal that defines a period where valid digital video data is supplied. The dot clock may be a signal which is repeated at a certain short period.

The timing controller 40 may divisionally operate the in-cell touch display device according to an embodiment of the present disclosure in a display mode during the display period DP and operate the in-cell touch display device in a touch mode during a touch period TP. The timing controller 40 may generate a mode signal MODE for differentiating the display mode and the touch mode. In this case, the timing controller 40 may output the mode signal MODE having a first logic level voltage during the display period DP and output the mode signal MODE having a second logic level voltage during the touch period TP.

The timing controller 40 may generate the gate driver control signal GCS for controlling an operation timing of the gate driver 20 and the data driver control signal DCS for controlling an operation timing of the data driver 30, based on the timing signals. The timing controller 40 may generate a touch control signal TCS for controlling an operation timing of the touch driver 60. During the display period DP, the timing controller 40 may output the gate driver control signal GCS to the gate driver 20 and may output the digital video data DATA and the data driver control signal DCS to the data driver 30. The timing controller 40 may output the touch control signal TCS and the mode signal MODE to the touch driver 60. The timing controller 40 may output the mode signal MODE to the common voltage compensator 70.

The main processor 50 may be implemented with a central processing unit (CPU) of one of a navigation system, a set-top box, a DVD player, a Blu-ray player, a personal computer (PC), a personal movies system, a broadcast receiver, a smartphone, a tablet PC, and a mobile terminal, a host processor, an application processor, or a graphic processing unit (GPU). The main processor 50 may convert the digital video data DATA into a format suitable to be displayed on the display panel 10 and may transmit data, obtained through the conversion, to the timing controller 40.

The main processor 50 may receive touch coordinate data CD from the touch driver 60. The main processor 50 may execute an application program associated with coordinates at which a touch is performed by a user, based on the touch coordinate data CD. The main processor 50 may transmit the digital video data DATA and the timing signals to the timing controller 40, based on the executed program.

Figure 4:
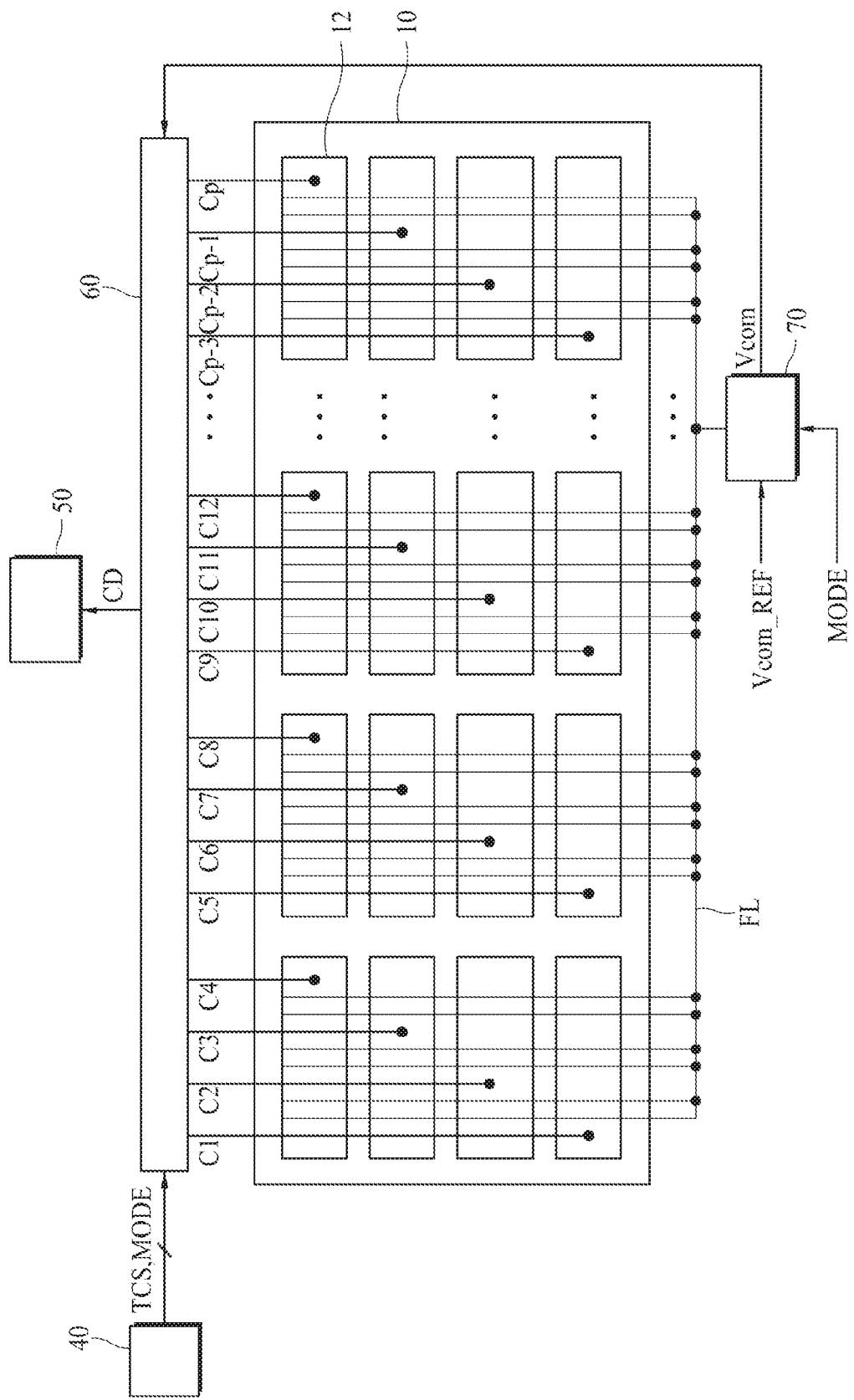
FIG. 4 is a diagram illustrating common electrodes, common lines, feedback lines, a touch driver, and a common voltage compensator of the display panel of FIG. 1 according to one embodiment of the present disclosure.

FIG. 4 is an exemplary diagram illustrating the common electrodes 12, the common lines C1 to Cp, the feedback lines FL, the touch driver 60, and the common voltage compensator 70 of the display panel 10 of FIG. 1. A plurality of common electrodes 12 may be provided in the display panel 10. Each of the common electrodes 12 may be connected to one corresponding common line of the common lines C1 to Cp. Each of the common lines may connect a corresponding common electrode 12 to the touch driver 60.

The feedback lines FL may be disposed between two adjacent common lines. In FIG. 4, it is illustrated that two feedback lines are disposed between two adjacent common lines, but the present embodiment is not limited thereto.

The touch driver 60 may receive the touch control signal TCS and the mode signal MODE from the timing controller 40. The touch driver 60 may receive the common voltage Vcom from the common voltage compensator 70.

The touch driver 60 may divisionally operate in the display period DP and the touch period TP according to the mode signal MODE. During the touch period TP, the touch driver 60 may generate touch signals TS1 to TSp according to the touch control signal TCS.

The touch driver 60 may supply the touch signals TS1 to TSp to the common lines C1 to Cp in a predetermined order. When the predetermined order is a sequential order, the touch driver 60 may sequentially supply first to pth touch signals TS1 to TSp to first to pth common lines C1 to Cp.

The touch driver 60 may receive touch sensing signals based on the touch signals TS1 to TSp from the common electrodes 12. The touch driver 60 may perform an arithmetic operation on the touch sensing signals by using a certain algorithm to calculate touch coordinates at which a touch is made. The touch driver 60 may supply the touch coordinate data CD including the touch coordinates to the main processor 50. In this case, the main processor 50 may execute an application program associated with coordinates at which the touch is made by a user, based on the touch coordinate data CD and may transmit the digital video data DATA and the timing signals to the timing controller 40, based on the executed program.

The common voltage compensator 70 may receive a reference common voltage Vcom_REF through a reference common voltage line from a power supply source, receive the mode signal MODE from the timing controller 40, and receive the common voltage variation amounts of the common electrodes 12 through the feedback lines FL. The common voltage compensator 70 may divisionally operate in the display period DP and the touch period TP according to the mode signal MODE. Since the touch signals TS1 to TSp are supplied to the common electrodes 12 during the touch period TP, the common voltage compensator 70 may compensate for the common voltage Vcom according to the voltage variation amounts of the feedback lines FL during only the display period DP. In detail, the common voltage compensator 70 may inversely amplify the common voltage variation amounts reflected in the feedback lines FL with respect to a level of the reference common voltage Vcom_REF, thereby outputting a common voltage obtained by compensating for the common voltage variation amount affected by unspecified noise occurring in the display panel 10.

Figure 5:
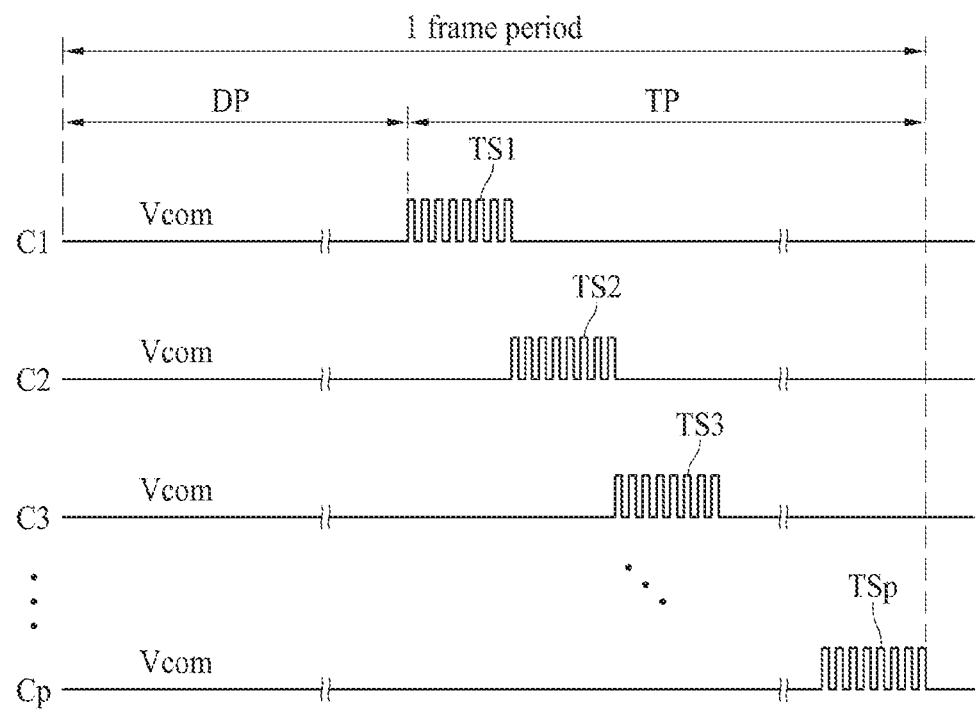
FIG. 5 is a waveform diagram illustrating touch signals and a common voltage supplied to common electrodes during a display period and a touch period of one frame period according to one embodiment of the present disclosure.

FIG. 5 is a waveform diagram showing touch signals TS1 to TSp and a common voltage Vcom supplied to common electrodes during a display period DP and a touch period TP of one frame period (1 frame period). In order to perform all of an image display operation and a touch sensing operation, the in-cell touch display device according to an embodiment of the present disclosure may temporally divide and drive the display period DP and the touch period TP. The timing controller 40 may operate the in-cell touch display device according to an embodiment of the present disclosure in the display mode during the display period DP of the one frame period and may operate the in-cell touch display device in the touch mode during the touch period TP.

The touch driver 60 may supply the common voltage Vcom to the common electrodes 12 through the common lines C1 to Cp during the display period DP. During the touch period TP, the touch driver 60 may supply the touch signals TS1 to TSp to the common electrodes 12 through the common lines C1 to Cp. The common electrodes 12 may be supplied with the common voltage Vcom through the common lines C1 to Cp from the touch driver 60 during the display period DP and may be supplied with the touch signals TS1 to TSp during the touch period TP.

In FIG. 5, the one frame period is shown as including one display period DP and one touch period TP, but is not limited thereto. In other embodiments, the one frame period may include a plurality of display periods DP and a plurality of touch periods TP. The touch signals TS1 to TSp may include a plurality of pulses. Also, in FIG. 5, the touch signals TS1 to TSp are described as having a voltage which has a level higher than that of the common voltage Vcom, but are not limited thereto.

Figure 6:
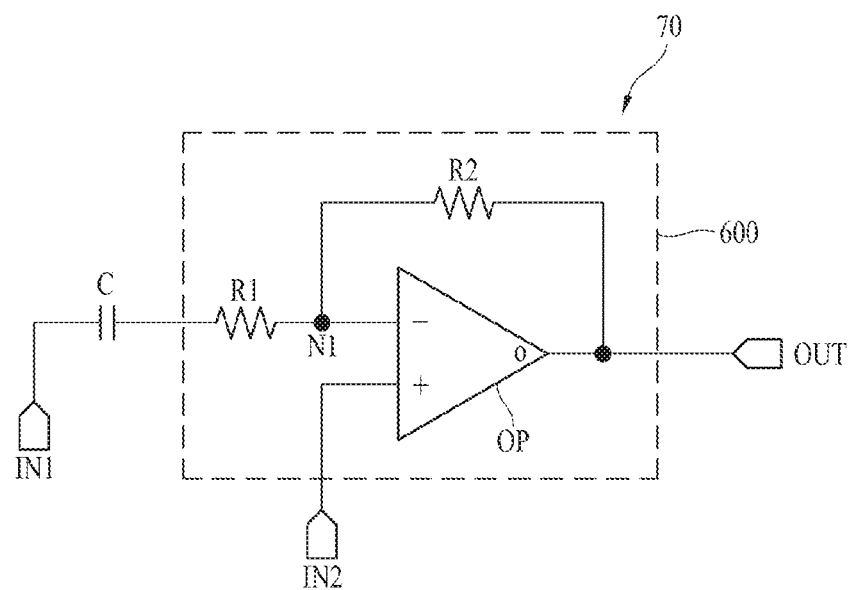
FIG. 6 is a circuit diagram illustrating the common voltage compensator of FIG. 4 according to one embodiment of the present disclosure.

FIG. 6 is a circuit diagram illustrating in detail an example of the common voltage compensator 70 of FIG. 4. The common voltage compensator 70 may include first and second input terminals IN1 and IN2, an output terminal OUT, a capacitor C, and an inverting amplification unit 600. However, the common voltage compensator 70 according to an embodiment of the present disclosure is not limited to the illustration of FIG. 6. In other embodiments, the common voltage compensator 70 may compensate for the common voltage by using another common voltage compensation circuit well known to those skilled in the art.

The first input terminal IN1 may be connected to the one line into which the feedback lines FL are grouped. That is, the common voltage variation amounts of the common electrodes 12 reflected in the feedback lines FL may be input to the first input terminal IN1.

The second input terminal IN2 may be connected to the reference common voltage line through which the reference common voltage Vcom_REF is supplied. The reference common voltage Vcom_REF may be supplied to the second input terminal IN2. The reference common voltage Vcom_REF may be a DC voltage input from the power supply source.

The output terminal OUT may be connected to the touch driver 60. The output terminal OUT may output the common voltage Vcom. The output common voltage Vcom may be input to the touch driver 60.

The capacitor C may be provided between the first input terminal IN1 and the inverting amplification unit 600. The capacitor C may supply the common voltage variation amount, input to the first input terminal IN1, to an inverting input terminal (−) of an operational amplifier (OP-AMP) OP of the inverting amplification unit 600.

The inverting amplification unit 600 may include the operational amplifier (OP-AMP) OP, a first resistor R1, and a second resistor R2. The operational amplifier OP may include a non-inverting input terminal (+) which is connected to the second input terminal IN2 to receive the reference common voltage Vcom_REF which is a DC source voltage, the inverting input terminal (−) which is connected to the first input terminal IN1 to receive a feedback voltage, and an OP-AMP output terminal o. The first resistor R1 may be connected between the inverting input terminal (−) of the operational amplifier OP and the first input terminal IN1. The second resistor R2 may be connected between the inverting input terminal (−) and the OP-AMP output terminal o of the operational amplifier OP. The inverting amplification unit 600 may inversely compensate for the common voltage variation amount input to the inverting input terminal (−) with respect to the level of the reference common voltage Vcom_REF input to the non-inverting input terminal (+) of the operational amplifier OP, based on a resistance ratio of the first and second resistors R1 and R2 and may output the inversely-compensated common voltage variation amount.

As described above, the common voltage compensator 70 according to an embodiment of the present disclosure may receive the common voltage variation amounts of the common electrodes 12 reflected in the feedback lines FL, and thus, may compensate for the common voltage Vcom, based on all of the noise by which the common electrodes 12 are affected.

Figure 7:
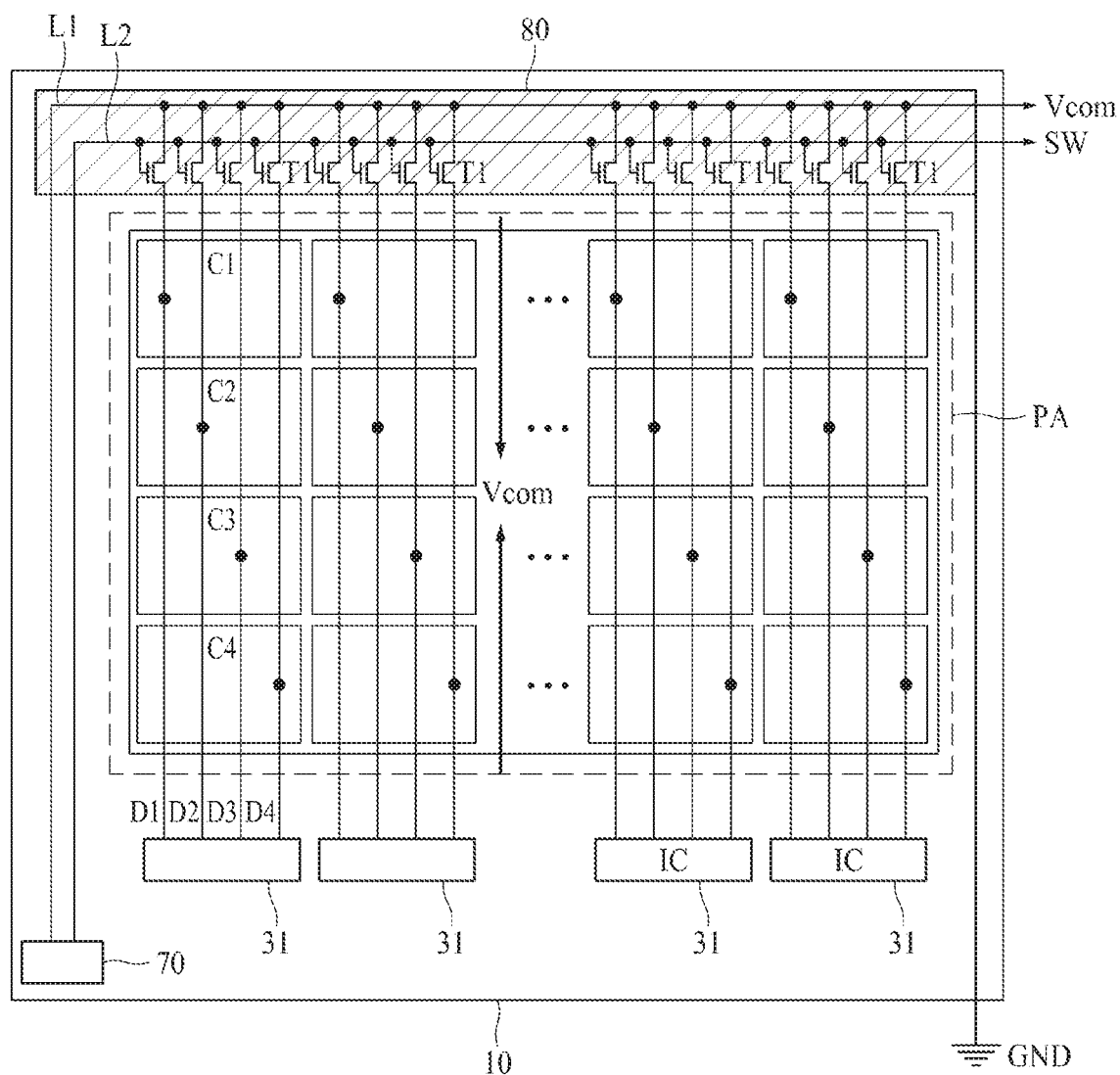
FIG. 7 is a diagram illustrating a back transistor and a passivation layer of a display panel according to one embodiment of the present disclosure.

FIG. 7 is an exemplary diagram illustrating a back transistor T1 and a passivation layer 80 of a display panel according to an embodiment of the present disclosure.

An in-cell touch display device according to an embodiment of the present disclosure may include a pixel P which displays an image in a display period DP, a display panel 10 including a common electrode 12 which senses a touch in a touch period TP, a data driver 30 that supplies a data voltage for driving the pixel P, a common voltage compensator 70 that generates a common voltage Vcom for driving the common electrode 12, a back transistor T1 that transfers the common voltage Vcom to the common electrode 12, and a passivation layer 80 that covers the back transistor T1.

The common electrode 12 may be provided in plurality, and the in-cell touch display device according to an embodiment of the present disclosure may include a double feeding means that connects the common electrodes 12 by using the back transistor T1 during the display period DP and supplies the common voltage 12 to the common electrodes 12. The double feeding means may apply to the common voltage Vcom at both ends of common lines C1 to Cp to decrease the delay of the common voltage Vcom applied to the common electrodes 12, thereby making the common voltage Vcom of the pixels P uniform in a whole screen of a display area PA.

The back transistor T1 may be provided in plurality, and the back transistors T1 may be disposed in a bezel, which is a non-display area provided outside the display area PA of the display panel 10.

The back transistors T1 may transfer the common voltage Vcom during the display period DP. During the display period DP, the common lines C1 to Cp may be short-circuited with one another. During the touch period TP, the back transistors T1 may divide the common lines C1 to Cp to allow the common electrodes 12 to be independently driven.

The back transistors T1 may connect the common lines C1 to Cp connected to a plurality of source drive ICs 31 included in the data driver 30. The back transistors T1 may be disposed in an area, which is opposite to an area where the source drive ICs 31 are disposed, of a non-display area. For example, as in FIG. 7, in a case where the source drive ICs 31 are connected to a lower end of the non-display area, the back transistor T1 may be connected to an upper end of the non-display area. However, the present embodiment is not limited thereto. In other embodiments, the source drive ICs 31 and the back transistors T1 may be respectively disposed on the left and the right of the non-display area with the display area PA therebetween.

The back transistors T1 may have a structure and a size which are the same as those of each of thin film transistors (TFTs) of the pixels P. The back transistors T1 may be formed simultaneously with the TFTs of the pixels P. The back transistors T1 may each include a gate terminal connected to a switching line L2, a drain terminal connected to a common voltage supply line L1, and a source terminal connected to the common lines C1 to Cp.

The back transistor T1 may selectively connect the common voltage supply line L1 to the common lines C1 to Cp in response to a voltage of the switching line L2. Therefore, the back transistor T1 may selectively transfer the common voltage Vcom to the common electrodes 12 according to a signal of the switching line L2. Also, depending on the case, the back transistor T1 may additionally supply the common voltage Vcom through the common voltage supply line L1, thereby making the common voltage Vcom of the common electrodes 12 uniform in the display panel 10.

The common voltage supply line L1 and the switching line L2 may be low-resistance metal lines provided along the non-display area. During the display period DP, the common voltage compensator 70 may supply the common voltage Vcom to the common voltage supply line L1 and may supply a gate high voltage VGH through the switching line L2 to turn on the back transistor T1. During the display period DP, the back transistor T1 may supply the common voltage Vcom, transferred through the common voltage supply line L1, to the common lines C1 to Cp in response to the gate high voltage VGH applied through the switching line L2.

The back transistor T1 may maintain a turn-off state during the touch period TP. An alternating current (AC) signal having the same phase as that of each of the touch signals TS1 to TSp may be applied to the gate terminal and the drain terminal of the back transistor T, for minimizing a parasitic capacitance with the common lines C1 to Cp.

The common voltage supply line L1 and the switching line L2 may be connected to the common voltage compensator 70 through a flexible printed circuit (FPC).

A direct current (DC) voltage electric field (DC field) based on the common voltage is generated in an outer area of the display area. A black matrix (BM) which divides the pixels in order for lights emitted from the pixels not to be mixed with one another is provided on an upper substrate of the display panel. A general resin BM is a BM which is formed of a resin having a resistance which is $10^6$ Ω/D or less per unit length. The general resin BM is relatively low in resistance, and thus, disperses electric charges well. Therefore, in a case using the general resin BM, a DC accumulation amount based on the DC voltage electric field is small.

However, the general resin BM prevents a capacitance from being generated between a touch electrode and a finger due to a touch by a finger or the like. A capacitance is generated between the general resin BM and a finger. Therefore, in a case where the general resin BM is applied to the in-cell touch display device, touch performance is reduced. Therefore, among resin BMs, a high-resistance BM formed of a resin having a resistance which is $10^{10}$ Ω/D or more per unit length should be used for enhancing a touch performance of the in-cell touch display device.

When the DC voltage electric field is generated for a long time, due to a high resistance of the high-resistance BM, it is difficult for the high-resistance BM to disperse electric charges, and for this reason, DC accumulation is caused by the DC voltage electric field. In the in-cell touch display device including the high-resistance BM which is high in DC accumulation amount, adsorption of a pollution component occurs much.

The display device according to an embodiment of the present disclosure may include the passivation layer 80 that covers the back transistor T1. The passivation layer 80 may cover the non-display area where the back transistors T1 are provided. The passivation layer 80 may cover an area where the gate terminal, the drain terminal, and the source terminal of the back transistor T1 are provided.

The passivation layer 80 may be disposed between a lower substrate where the back transistors T1 are provided and an upper substrate where the high-resistance BM is provided. The passivation layer 80 may be disposed adjacent to the high-resistance BM.

The passivation layer 80 may be connected to a ground GND disposed in the non-display area of the display panel 10. The ground GND may be provided in one end of the display panel 10. The ground GND may set a ground voltage of source voltages. Therefore, the passivation layer 80 may maintain the ground voltage.

The passivation layer 80 may be formed of metal or low-resistance metal oxide. In a case where the passivation layer 80 is formed of metal, the passivation layer 80 may use a low-resistance metal material which is the same as that of each of the common voltage supply line L1 and the switching line L2. In a case where the passivation layer 80 is formed of low-resistance metal oxide, the passivation layer 80 may use a material which is lower in resistance per unit area than that of the high-resistance BM.

For example, the passivation layer 80 according to an embodiment of the present disclosure may use a material having a resistance of $10^6$ Ω/D or less which is $10^{-4}$ times lower than a resistance per unit area of the high-resistance BM. Therefore, by decreasing a high resistance per unit area of the high-resistance BM to that of the general resin BM, DC accumulation based on a DC voltage electric field is reduced to that of the general resin BM.

The in-cell touch display device according to an embodiment of the present disclosure may include the passivation layer 80 having a resistance per unit area which is lower than that of the high-resistance BM. When a DC voltage electric field is provided for a long time, since the passivation layer 80 has a resistance lower than that of the high-resistance BM, the passivation layer 80 can more easily disperse electric charges than the high-resistance BM. Therefore, DC accumulation based on the DC voltage electric field is smaller than a case where only the high-resistance BM is provided. Accordingly, in the in-cell touch display device according to an embodiment of the present disclosure, adsorption of a pollution component occurs smaller than an in-cell touch display device where only the high-resistance BM is provided.

For example, the passivation layer 80 of the in-cell touch display device according to an embodiment of the present disclosure may be provided adjacent to a BM which divides each of the pixels P in order for lights emitted from the pixels not to be mixed with one another. In this case, even in a case where the high-resistance BM is used, if electric charges can be accumulated into the high-resistance BM, the passivation layer 80 may receive the accumulated electric charges. Accordingly, electric charges are prevented from being accumulated into the high-resistance BM.

As described above, the in-cell touch display device according to the embodiments of the present disclosure may include the passivation layer that covers the back transistor. The passivation layer according to the embodiments of the present disclosure may block a DC voltage electric field or may disperse electric charges accumulated based on the DC voltage electric field, and thus, even in a case where the high-resistance BM is used, DC accumulation is not caused by the DC voltage electric field. Accordingly, the in-cell touch display device according to the embodiments of the present disclosure prevents the DC accumulation from being caused by the DC voltage electric field despite using the high-resistance BM, thereby reducing adsorption of a pollution component.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device comprising:
    a display panel including a first substrate, a second substrate, and a liquid crystal layer disposed between the first substrate and the second substrate;
    a pixel provided on the first substrate and in an intersection portion of a data line and a gate line, the pixel disposed in a display area of the display panel that displays an image;
    a common electrode provided on the first substrate and disposed in the display area of the display panel;
    a back transistor provided on the first substrate and disposed in a non-display area of the display panel, the image not displayed in the non-display area, wherein the back transistor supplies a common voltage to the common electrode; and
    a passivation layer provided on the first substrate and covering the back transistor to reduce electric charges from being accumulated in a black matrix that is adjacent to the passivation layer, wherein the passivation layer is disposed in the non-display area of the display panel and is formed of a metal or a low-resistance metal oxide.

2. The display device of claim 1, further comprising:
    a common voltage compensator generating the common voltage for driving of the common electrode; and
    a data driver supplying a data voltage for driving of the pixel.

3. The display device of claim 2, further comprising:
    a common voltage supply line connecting the common voltage compensator to the back transistor.

4. The display device of claim 3, further comprising:
    a switching line connecting the common voltage compensator to the back transistor.

5. The display device of claim 4, wherein the common voltage supply line is connected to a drain terminal of the back transistor, and the switching line is connected to a gate terminal of the back transistor.

6. The display device of claim 1, wherein the passivation layer is connected to a ground disposed in the non-display area of the display panel to disperse the electric charges in the black matrix to the ground.

7. The display device of claim 1, wherein the pixel is provided in plurality, and wherein the black matrix is formed on the substrate and divides each of the plurality of pixels so that light emitted from each of the plurality of pixels does not mix with one another.

8. The display device of claim 1, wherein a resistance per unit length of the passivation layer is less than a resistance per unit length of the black matrix.

* * * * *